United States Patent [19]

Boles

[11] Patent Number: 4,546,355
[45] Date of Patent: Oct. 8, 1985

[54] RANGE/AZIMUTH/ELEVATION SHIP IMAGING FOR ORDNANCE CONTROL

[75] Inventor: Sol Boles, Syosset, N.Y.

[73] Assignee: Grumman Aerospace Corporation, Bethpage, N.Y.

[21] Appl. No.: 389,369

[22] Filed: Jun. 17, 1982

[51] Int. Cl.$^4$ .................................... G01S 13/90
[52] U.S. Cl. .............................. 343/17; 343/5 CM; 343/7 ED
[58] Field of Search .......... 343/5 CM, 7 G, 10, 11 R, 343/17, 7 ED; 364/516, 517

[56] References Cited

U.S. PATENT DOCUMENTS

| | | | |
|---|---|---|---|
| 2,996,706 | 8/1961 | Newell et al. | 343/7 ED |
| 3,453,619 | 7/1969 | Wright | 343/8 |
| 3,610,901 | 10/1971 | Lynch | 343/5 DP X |
| 3,733,603 | 5/1973 | Johnston | 343/5 SA |
| 3,735,400 | 5/1973 | Sletten et al. | 343/7.7 |
| 3,798,425 | 3/1974 | Heard et al. | 343/5 DP X |
| 3,806,929 | 4/1974 | Moore | 343/5 SA |
| 3,983,558 | 9/1976 | Rittenbach | 343/7.7 |
| 3,987,440 | 10/1976 | Danzer | 343/7 A |
| 3,987,442 | 10/1976 | McLeod, Jr. | 343/7.7 |
| 3,993,994 | 11/1976 | Goggins | 343/5 CM |
| 4,068,231 | 1/1978 | Wilmot | 343/5 CM |
| 4,084,158 | 4/1978 | Slawsby | 343/5 CM |
| 4,086,590 | 4/1978 | Goggins, Jr. | 343/5 CM |
| 4,101,890 | 7/1978 | Goyard | 343/8 |
| 4,101,891 | 7/1978 | Jain et al. | 343/17.2 PL |
| 4,134,113 | 1/1979 | Powell | 343/5 CM |

*Primary Examiner*—T. H. Tubbesing
*Assistant Examiner*—Gilberto Barrón, Jr.
*Attorney, Agent, or Firm*—Richard G. Geib; Daniel J. Tick; Bernard S. Hoffman

[57] ABSTRACT

Capability is provided for producing 3 scaled high resolution orthogonal image projections on a CRT of a ship under the influence of translational as well as rotational motions arising from sea state conditions, for the purpose of ship target identification and classification, and the subsequent carrying out of stand-off command weapon guidance to a designated resolution cell of the ship from an airborne platform. Doppler processed interferometric azimuth and elevation angle measurements of the ship scatterers derived from a coherent synthetic aperture radar are combined in a weighted multivariate regression fit using digital signal processing techniques to provide measures of ship translational and rotational motions essential to providing focussed high resolution imagery and precision standoff weapon delivery to the designated ship target resolution cell. The invention also provides a capability for scaling the cross-range (doppler) dimension of Inverse SAR Profile Imagery.

18 Claims, 7 Drawing Figures

RANGE/AZIMUTH/ELEVATION SHIP IMAGING FOR ORDNANCE CONTROL

The Government has rights in this invention pursuant to contract N00019-79-C-0075 awarded by the Department of the Navy.

BACKGROUND OF THE INVENTION

The present invention relates to radar controlled weapons systems and, more particularly, to a method and apparatus for generating real-time high resolution Synthetic Aperture Radar (SAR) imagery from an airborne platform of a translating ship under the influence of roll, pitch, and yaw motions characteristic of sea state conditions.

A highly resolved ship image on an airborne display permits targeting to a particular part of a ship for the purpose of standoff command guidance weapon delivery. As such, this invention relates to airborne SAR systems used for generating real-time high resolution imagery of a ship target under the influence of sea state conditions and for accurately measuring and tracking the range and azimuth angle of a designated resolution cell within the aforesaid displayed target area so as to enable the accurate delivery of an air-to-ground missile or glide bomb from the SAR bearing aircraft to the ship target. The manner of weapon guidance depends upon reducing to zero the relative range and azimuth angle between weapon and designated target resolution cell.

Existing airborne synthetic aperture radar systems have the capability for producing a high resolution image of stationary ground targets by virtue of the rotational motion of the SAR with respect to the target field. High resolution in both range and cross-range (azimuth) directions are achieved with short-pulse radar techniques for range resolution, and by digital signal doppler processing for azimuth resolution, so as to produce a two-dimensional image. The application of such known SAR processing techniques to a ship at sea, however, can readily produce distorted and improperly focused ship imagery, precluding ship recognition, because of ship rotational motions brought about by sea state conditions.

Systems for ameliorating some of the adverse effects brought about by ship rotational motions are described in the commonly assigned copending U.S. patent applications of Sol Boles, entitled "Range/Azimuth Ship Imaging For Ordnance Control", Ser. No. 389,367, and entitled "Range/Doppler Ship Imaging For Ordnance Control", Ser. No. 389,368, filed concurrently herewith, the disclosures of which are incorporated herein by reference. The first invention provides an undistorted two-dimensional image of the ship from a direct plot of range versus interferometrically determined azimuth angle of all essential scatterers comprising the ship. The second invention, on the other hand, provides an improvement in image definition, as well as performance to greater ranges, by displaying range versus doppler, after removal of the isodop type distortions inherent in the formed range/doppler image.

Notwithstanding the advantages achieved in conjunction with each of the above-identified inventions, they do have certain operational limitations and drawbacks in certain applications. For example, each of the aforementioned inventions is subject to the limitations on image resolution brought about by the distributed elevation angles of the essential scatterers comprising the ship target.

The invention disclosed herein is related to the inventions described in the aforementioned applications of Boles, but by a unique processing implementation, is capable of removing any restrictions due to ship scatterer elevation on the formation of a scaled high resolution image. This advantage is brought about by utilizing elevation angle, as well as azimuth angle, interferometric techniques in conjunction with SAR signal processing techniques.

It is accordingly an object of the present invention to provide a method and apparatus for generating high resolution synthetic aperture radar displayed imagery from an airborne platform of a ship under the influence of sea state conditions.

It is another object of the present invention to provide a method and apparatus for eliminating the distortions inherent in displayed ship imagery brought about by the distributed elevation angles of the essential scatterers comprising the ship target.

It is still another object of the present invention to provide focussed high resolution imagery of a ship target so as to permit the cursoring and tracking of a particular target resolution cell for the purpose of carrying out standoff command guidance weapon delivery to said target.

It is a still further object of the present invention to provide a method and apparatus for providing scaling of the cross-range (doppler) dimension of Inverse SAR Profile Imagery.

SUMMARY OF THE INVENTION

The foregoing and other objects and advantages which will be apparent in the following detailed description of the preferred embodiment, or in the practice of the invention, are achieved by the invention disclosed herein, which generally may be characterized as a method and apparatus for forming, in conjunction with an airborne synthetic aperture radar system having an interferometer antenna and a display, high resolution synthetic aperture radar imagery of a ship target under the influence of sea state conditions.

In accordance with the teachings of the invention, high resolution synthetic aperture radar imagery of a ship target under the influence of sea state conditions is formed by processing the received signals from the scatterers comprising the ship target to obtain an estimate of the net doppler producing velocities resulting from the respective motions of the radar bearing aircraft and the ship, and determining from the estimated doppler producing velocities the values of predetermined system parameters to be used predictively in the succeeding integration interval in forming the high resolution imagery of the ship target.

BRIEF DESCRIPTION OF THE DRAWINGS

Serving to illustrate an exemplary embodiment of the invention are the drawings of which.

DESCRIPTION OF THE PREFERRED EMBODIMENT

Figure 1:
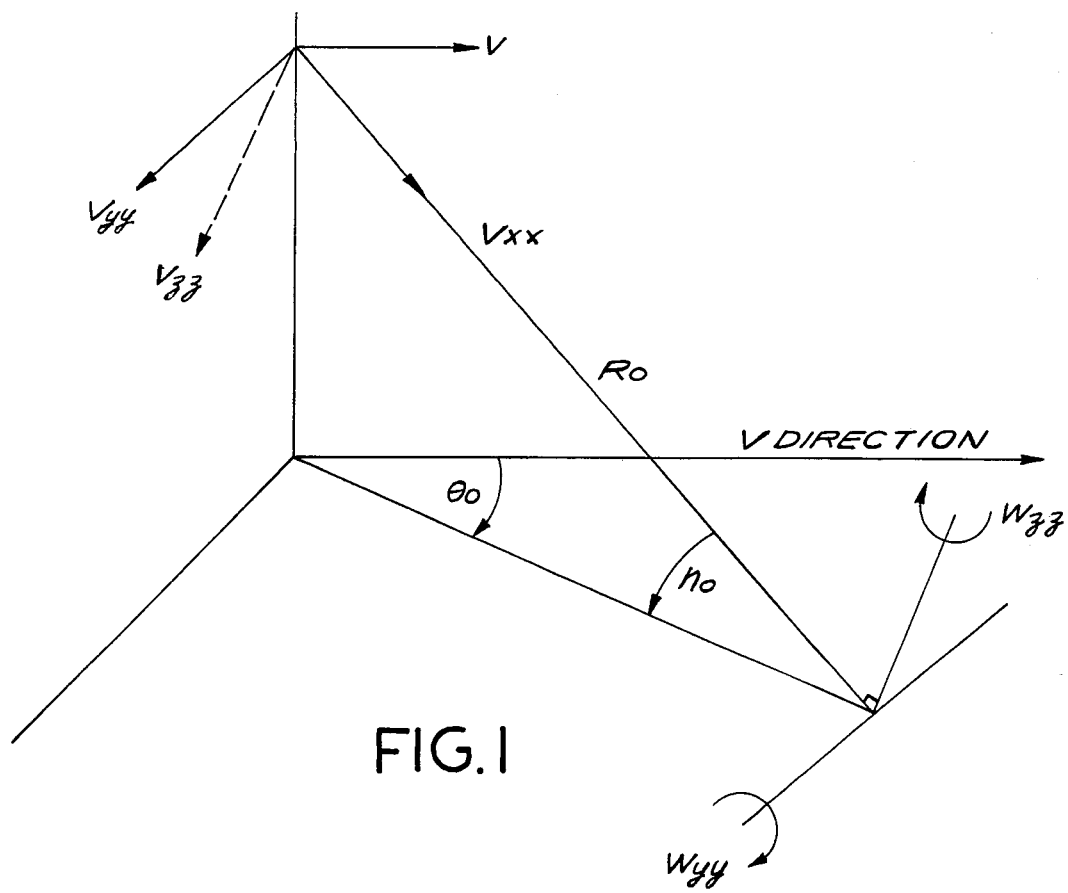
FIG. 1 illustrates aircraft and ship target geometrical and motional relationships which influence the doppler frequencies associated with the signals reflected from the ship target.

Referring to FIG. 1 the aircraft and ship target geometrical and motional relationships which influence the doppler frequencies associated with the signals reflected from the ship target are illustrated. As shown therein, the net doppler shift, $f_d$, associated with the signal reflected from a scatterer located at azimuth and elevation angle differences, $\overline{\Delta\theta}$ and $\Delta\eta$, respectively, with respect to a boresight line-of-sight drawn to the center of ship rotation, considering for the moment, ship translation (without rotation), is given by $$f_d = 2/\lambda(V_{xx} + V_{yy}\overline{\Delta\theta} + V_{zz}\Delta\eta) \qquad (1)$$

where $V_{xx}$, $V_{yy}$, and $V_{zz}$ represent the relative line-of-sight and cross line-of-sight velocity components due to both aircraft and ship translations, such that, $$V_{xx} = (V_{xx})_{A/C} - (V_{xx})_{SHIP} \qquad (2)$$

$$V_{yy} = (V_{yy})_{A/C} - (V_{yy})_{SHIP} \qquad (3)$$

$$V_{zz} = (V_{zz})_{A/C} - (V_{zz})_{SHIP} \qquad (4)$$

and where the line-of-sight is drawn to the center of rotation of the ship. (It is to be noted that $\overline{\Delta\theta}$ is the azimuth angle in the slant plane containing $V_{xx}$ and $V_{yy}$.) Ship rotations of $W_{zz}$ and $W_{yy}$ about the two critical axes in FIG. 1 give rise to additional doppler shifts, respectively, of $(2/\lambda)(W_{zz}R_o)(\overline{\Delta\theta})$ and $(2/\lambda)(W_{yy}R_o)\Delta\eta$ where $R_o$ is the slant range along boresight to the focus point. Equation (1) can therefore be written, including ship rotational motions, $$f_d = 2/\lambda(V'_{xx} + V'_{yy}\overline{\Delta\theta} + V'_{zz}\Delta\eta) \qquad (5)$$

where, $$V'_{xx} \equiv V_{xx} \qquad (6)$$

$$V'_{yy} \equiv V_{yy} + W_{zz}R_o \qquad (7)$$

$$V'_{zz} \equiv V_{zz} + W_{yy}R_o \qquad (8)$$

The motion compensation system attempts to remove the doppler shift due to the line-of-sight velocity term, $\tilde{V}_{xx}$, using the line-of-sight velocity estimate, $\tilde{V}'_{xx}$, where $V'_{xx} = V_{xx} + \epsilon_{V'xx}$, $\epsilon_{V'xx}$ is the error in line-of-sight velocity. Accordingly, Equation (5) can be stated, after motion compensation, $$f_d = 2/\lambda(-\epsilon_{V'xx} + V'_{yy}\overline{\Delta\theta} + V'_{zz}\Delta\eta). \qquad (9)$$

Without further corrections, a doppler processed ship image would lack display centering in proportion to the error in line-of-sight velocity $\epsilon_{V'xx}$. As noted in the aforementioned application of Boles, entitled "Range/Doppler Ship Imaging For Ordnance Control", this error source could ordinarily be of considerable magnitude. Equation (9) expresses doppler shift in terms of scatterer azimuth and elevation angles, $\overline{\Delta\theta}$ and $\Delta\eta$, motion compensation velocity error $\epsilon_{V'xx}$, and velocities $V'_{yy}$ and $V'_{zz}$, which themselves are functions of ship rotational velocities, $W_{zz}$ and $W_{yy}$, and suggests that the three velocity constants could be ascertained from the (over-determined) set of measurement points, each one comprised of doppler, azimuth, and elevation angle measurements. To illustrate this, equation (9) is rearranged to read, $$\Delta\eta = \left(\frac{\lambda}{2V'_{zz}}\right)f_d - \left(\frac{V'_{yy}}{V'_{zz}}\right)\overline{\Delta\theta} + \left(\frac{\epsilon_{V'xx}}{V'_{zz}}\right) \qquad (10)$$

Doppler shift, $f_d$, is related to doppler cell index, $i_f$, after digital signal (Fourier Transform) processing, by, $$i_f = f_d\left(\frac{N_p}{f_r}\right) \qquad (11)$$

where $N_p$ is the number of pulses integrated over the synthetic aperture, and $f_r$ is the pulse repetition frequency. From equations (10) and (11), $$\Delta\eta = \left(\frac{\lambda}{2}\right)\left(\frac{f_r}{N_p}\right)\left(\frac{1}{V'_{zz}}\right)i_f - \qquad (12)$$

$$\left(\frac{V'_{yy}}{V'_{zz}}\right)\overline{\Delta\theta} + \left(\frac{\epsilon_{V'xx}}{V'_{zz}}\right)$$

It is to be noted that azimuth and elevation angles are determined interferometrically from azimuth and elevation phase shift measurements, $\phi_a$ and $\phi_e$, where, $$\overline{\Delta\theta} = \sin^{-1}[(\lambda/2\pi d_a)\phi_a] \qquad (13)$$

and $$\Delta\eta = \sin^{-1}[(\lambda/2\pi d_e)\phi_e], \qquad (14)$$

$d_a$ and $d_e$ are azimuth and elevation interferometer baseline distances, respectively.

Equation (12) is of the form, $$z = ax + by + c \qquad (15)$$

where x, y, and z denote doppler cell index, azimuth and elevation angles, respectively. The three constants, a, b, and c are solved for by performing a weighted least squares multivariate regression fit to the body of data, comprised of doppler, azimuth, and elevation angle coordinate values, using formulas from contemporary mathematical art. Accordingly, estimates of the three constants, $\bar{a}$, $\bar{b}$, and $\bar{c}$, are expressed by, $$\bar{a} = \frac{\Sigma w_i x_i z_i [\Sigma w_i y_i^2 \Sigma w_i - (\Sigma w_i y_i)^2]}{-\Sigma w_i y_i z_i [\Sigma w_i x_i y_i \Sigma w_i - \Sigma w_i y_i \Sigma w_i x_i]} \qquad (16)$$
$$\frac{-\Sigma w_i z_i [\Sigma w_i x_i y_i \Sigma w_i y_i - \Sigma w_i x_i \Sigma w_i y_i^2]}{D}$$

-continued $$b = \frac{\begin{aligned}&\Sigma w_i x_i^2 [\Sigma w_i y_i z_i \Sigma w_i - \Sigma w_i y_i \Sigma w_i z_i]\\&-\Sigma w_i x_i y_i [\Sigma w_i x_i z_i \Sigma w_i - \Sigma w_i x_i \Sigma w_i z_i]\\&+\Sigma w_i x_i [\Sigma w_i x_i z_i \Sigma w_i y_i - \Sigma w_i x_i \Sigma w_i y_i z_i]\end{aligned}}{D} \quad (17)$$

$$c = \frac{\begin{aligned}&\Sigma w_i x_i^2 [\Sigma w_i y_i^2 \Sigma w_i z_i - \Sigma w_i y_i \Sigma w_i y_i z_i]\\&-\Sigma w_i x_i y_i [\Sigma w_i x_i y_i \Sigma w_i z_i - \Sigma w_i y_i \Sigma w_i x_i z_i]\\&+\Sigma w_i x_i [\Sigma w_i x_i y_i \Sigma w_i y_i z_i - \Sigma w_i x_i z_i \Sigma w_i y_i^2]\end{aligned}}{D} \quad (18)$$

where, $$D = \begin{aligned}&\Sigma w_i x_i^2 [w_i y_i^2 \Sigma w_i - (\Sigma w_i y_i)^2]\\&-\Sigma w_i x_i y_i [\Sigma w_i x_i y_i \Sigma w_i - \Sigma w_i x_i \Sigma w_i y_i]\\&+\Sigma w_i x_i [\Sigma w_i x_i y_i \Sigma w_i y_i - \Sigma w_i x_i \Sigma w_i y_i^2]\end{aligned} \quad (19)$$

$x_i$, $y_i$, $z_i$ are the doppler cell index, azimuth, and elevation coordinates of the $i^{th}$ measurement point, and $w_i$ is a weighting factor inversely proportional to the variance of each data point, determined by its signal to noise power ratio, a readily measureable quantity.

Figure 2:
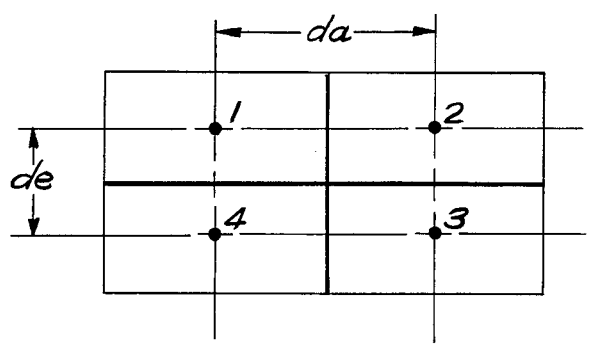
FIG. 2 depicts a four element interferometer antenna utilized for producing azimuth and elevation angle measurements.

Requisite azimuth and elevation angle measurements for the performance of the regression solutions as depicted by Equations (16) through (19) are obtained by reference to FIG. 2, which depicts the receiving aperture with four phase centers for azimuth and elevation signal separation. By way of illustration, the sum of signals received at phase centers 2 and 3 are phase compared to the sum of signals received at phase centers 1 and 4, after coherent pulse integration and Fast Fourier Transform (FFT) digital signal processing, to yield in each and every range bin, the azimuth angle of similarly indexed doppler filters, in accordance with Equation (13). Analogously, phase comparison of the sum of signals received at 1 and 2 versus the sum of signals received at 3 and 4, yields elevation angle measurements, in accordance with Equation (14), for similarly indexed doppler filters in each range bin.

From Equations (12) and (15) through (19), the estimated velocity components, $\tilde{\epsilon}_{v'xx}$, $\tilde{V}'_{yy}$, and $\tilde{V}'_{zz}$, are expressed by, $$\tilde{\epsilon}_{v'xx} = \left(\frac{\tilde{c}}{\tilde{a}}\right)\left(\frac{\lambda f_r}{2 N_p}\right) \quad (20)$$

$$\tilde{V}'_{yy} = -\left(\frac{\tilde{b}}{\tilde{a}}\right)\left(\frac{\lambda f_r}{2 N_p}\right) \quad (21)$$

and $$\tilde{V}'_{zz} = \left(\frac{1}{\tilde{a}}\right)\left(\frac{\lambda f_r}{2 N_p}\right). \quad (22)$$

The regression solutions for $\tilde{\epsilon}_{v'xx}$, $\tilde{V}'_{yy}$, and $\tilde{V}'_{zz}$ are used for the formation of the next synthetic aperture. The determined error in system line-of-sight velocity $\tilde{\epsilon}_{v'xx}$ permits a continual (aperture to aperture) update of the system $V'_{xx}$ estimate, thereby providing for an exact motion compensation correction for aircraft to ship net line-of-sight velocity. Similarly, the solutions for the net relative rotational velocities as denoted by $\tilde{V}'_{yy}$ and $\tilde{V}'_{zz}$, are used to establish doppler filter bandwidths and frequency separations, as well as the coherent integration time, for the formation of the next aperture of prescribed resolution.

Figure 3:
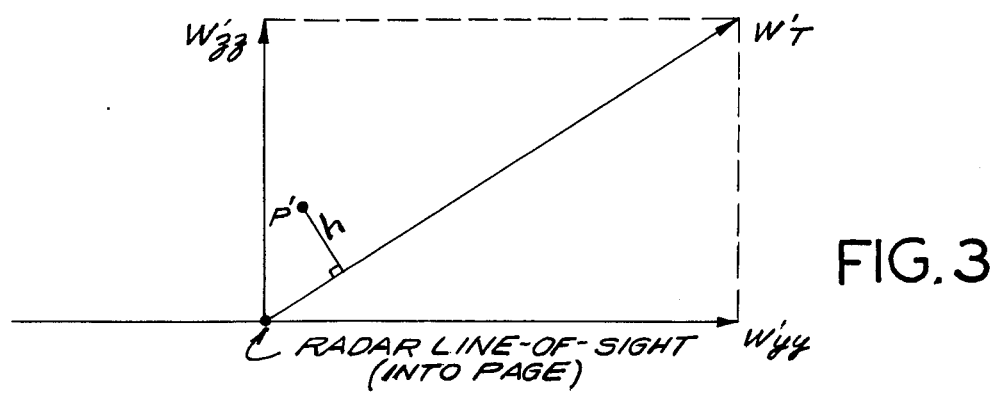
FIG. 3 illustrates the geometry pertinent to the formation of the net instantaneous axis of rotation, $W'_T$.

Referring now to FIG. 3, and letting $\tilde{W}'_{zz}$ and $\tilde{W}'_{yy}$ represent the net relative rotation rates between aircraft and ship derived from the regression solutions for $\tilde{V}'_{yy}$ and $\tilde{V}'_{zz}$, where $$\tilde{W}'_{zz} = \frac{\tilde{V}'_{yy}}{R_o} \quad (23)$$

and $$\tilde{W}'_{yy} = \frac{\tilde{V}'_{zz}}{R_o}, \quad (24)$$

then there exists a net instantaneous axis of rotation, $W'_T$, given by, $$\tilde{W}'_T = \sqrt{(\tilde{W}'_{zz})^2 + (\tilde{W}'_{yy})^2} = \frac{1}{R_o}\sqrt{(\tilde{V}'_{yy})^2 + (\tilde{V}'_{zz})^2}. \quad (25)$$

Also, the doppler shift, $|\Delta f|$, associated with the projection of a point into the plane formed by $W'_{zz}$ and $W'_{yy}$, located at a distance h from the direction of the axis of rotation, is given by, $$|\Delta f| = (2/\lambda) \tilde{W}'_T h. \quad (26)$$

Since the doppler sensitive direction is along the normal to $W'_T$, resolution is defined in this direction. From equation (26), the filter bandwidth, BW, required to resolve two scatterers in the normal direction separated by a prescribed resolution distance, $(d)_{res}$, is given by, $$BW = \left(\frac{2}{\lambda}\right)\tilde{W}'_T(d)_{res.} = \frac{2(d)_{res.}\sqrt{(\tilde{V}'_{yy})^2 + (\tilde{V}'_{zz})^2}}{\lambda R_o}. \quad (27)$$

Doppler filter separation is equal to the bandwidth, BW, and the coherent integration time, T, during which data is collected for the formation of the next synthetic aperture is, $$T = 1/BW. \quad (28)$$

It is to be noted that the magnitude (and direction) of $W'_T$ are ever changing under the influence of periodic ship rotational motions. The solution for $W'_T$ via Equation (25), however, provides for constant resolution in the direction normal to that of $W'_T$, as previously illustrated. The establishment of signal filtering and integration time in accordance with the solution for the net rotational vector, $W'_T$, minimizes any effects of scatterer accelerations during the coherent integration interval.

Figure 4:
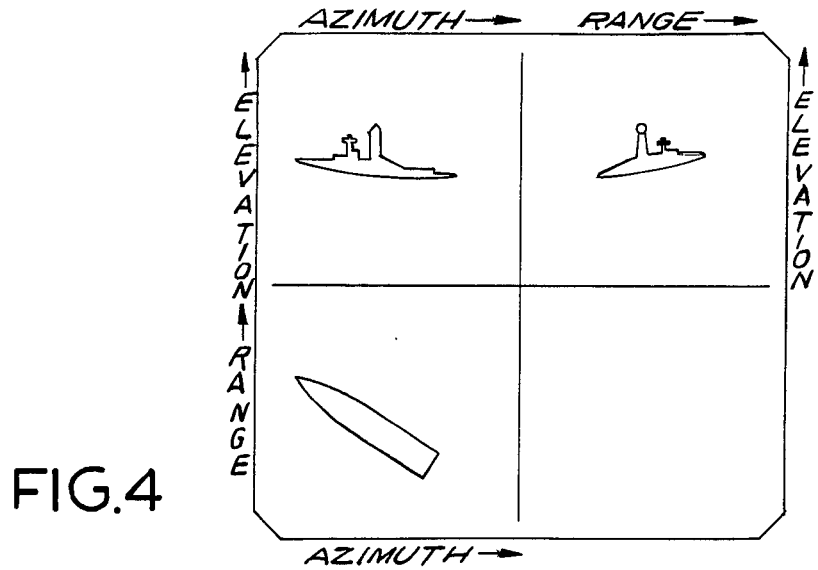
FIG. 4 depicts the representation on a split screen CRT of three orthogonal projections of a hypothetical ship target.

The data processed at the end of each synthetic aperture permits 3 scaled image projections with respect to the radar line-of-sight to be viewed on a cathode ray tube display, as illustrated in FIG. 4, as an aid to ship identification. These are range/azimuth, elevation/azimuth, and range/elevation image projections. In many cases either due to physical aperture restrictions or to general operational requirements governing the design of the airborne SAR system, elevation angle measurements are apt to be less accurate than azimuth angle measurements because of antenna gain or interferometer baseline considerations. Accordingly, considerable benefit can be derived by way of elevation angle accuracy improvement for image display by utilizing the smoothed regression constants and the relatively accurate frequency and azimuth angle measurements. To see this, Equation (12) can be rewritten, $$(\Delta \eta) = \bar{a}(i_f) + \bar{b}(\Delta \theta) + \bar{c}. \tag{29}$$

Using the determined constants, $\bar{a}$, $\bar{b}$, and $\bar{c}$, and the relatively accurate frequency and azimuth angle measurements, $i_f$ and $\overline{\Delta \theta}$, smoothed estimates of elevation angle are obtained, most frequently more accurate on a statistical basis than the individual elevation measurement points themselves. This elevation smoothing is another feature of the present invention and provides more accurate elevation/azimuth, and range/elevation image projections than would otherwise be obtained on the basis of the actual elevation angle measurements.

Figure 5:
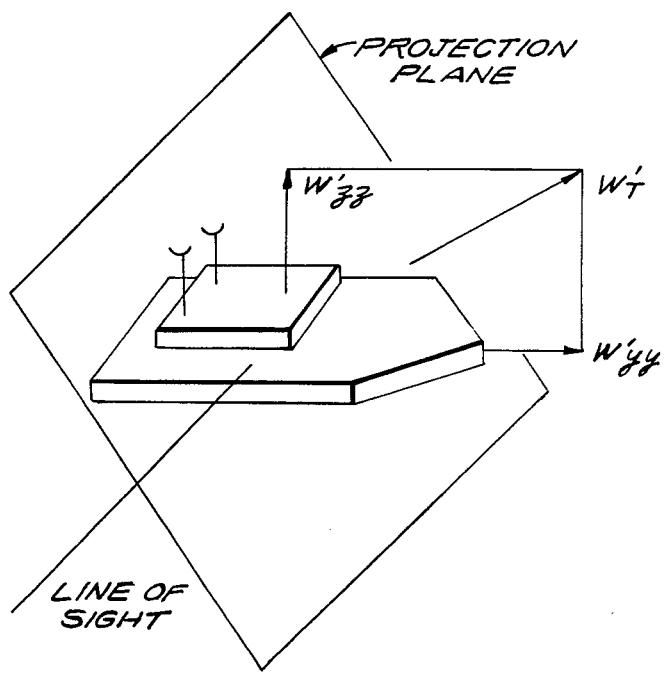
FIG. 5 illustrates the formation of an ISAR image projection.

The present invention also has applicability to the technique for producing a range/doppler image of a ship under the influence of sea state conditions, developed by the U.S. Naval Research Laboratory and known as ISAR (Inverse Synthetic Aperture Radar) imaging. The name denotes the fact that SAR doppler resolution stems from predominant target rotation over that arising from aircraft motion. Referring again to FIG. 3, it has previously been shown that there exists an instantaneous net rotation vector, $W'_T$, lying in the transverse plane to the radar line-of-sight, which determines the doppler frequency of any scatterer location projected onto the transverse plane, such as P', proportional to the distance h, of P' from the $W'_T$ axis, in accordance with Equation (26). A range/doppler processed (ISAR) image, therefore, is a representation of a projection along the $W'_T$ direction onto the projection plane, as depicted in FIG. 5. Such a projection provides profile information concerning the ship target in addition to subtended length along the slant range direction and is therefore useful for purposes of ship classification. (Ship profile is plotted vertically and slant range horizontally, so that ship elevation features plot more closely to the vertical direction on the CRT display.) Since $W'_T$ is a constantly varying quantity both in magnitude and direction, with a strong dependence upon instantaneous ship rotational motions, observed ISAR imagery undergoes variations in elevation profile as well as image inversions as the sign of $W'_{yy}$ changes. Scaling (of doppler) along the profile (cross-range) direction is unknown since it requires knowing the magnitude of $W'_T$. Operator intervention is, therefore, required to adjust the doppler (profile) scaling in accordance with the range of magnitudes of the rotation vector, $W'_T$. For a similar reason, resolution (aperture time) in the doppler dimension must be arbitrarily set. It can also be readily seen from FIG. 4, that a bow to stern ship aspect angle along the radar LOS is much more favorable from the point of view of both length and profile discrimination than is the broadside view, so that the effectiveness of ISAR is aspect angle sensitive.

Subject to the restrictions cited above, ISAR profile imaging has been useful as an aid to ship classification. It is inherently useful to relatively long range because adequate doppler imagery is achievable at modest signal to noise ratios. Due to the ever changing and unpredictable doppler history of any cursored range/doppler cell of the ship for targeting and weapon delivery purposes, however, sustained cursor tracking normally required during a weapon delivery phase is not achievable using ISAR.

In terms of the present invention, the regression solution for the estimates of $W'_{zz}$ and $W'_{yy}$, and hence the magnitude of the net rotational vector $W'_T$, provides the scaling along the doppler sensitive cross-range direction, as denoted by Equation (26). That is, in each range bin, the scaled cross-range displacement, $h_i$, of each scatterer whose doppler shift is $(\Delta f)_i$ is found from, $$h_i = \frac{\lambda}{2} \frac{(\Delta f)_i}{\widetilde{W}'_T}, \text{ for } \widetilde{W}'_{yy} < 0 \tag{30}$$

and $$h_i = -\frac{\lambda}{2} \frac{(\Delta f)_i}{\widetilde{W}'_T}, \text{ for } \widetilde{W}'_{yy} > 0. \tag{31}$$

Figure 6:
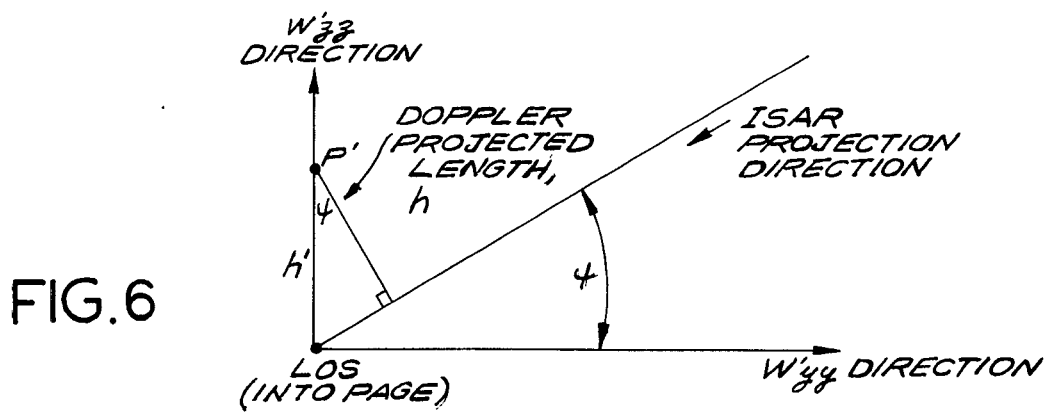
FIG. 6 illustrates the geometry pertinent to the formation of a "stretched" ISAR image projection.

In addition to providing scaling along the cross-range direction, Equations (30) and (31) provide for the removal of inversions in displayed imagery to facilitate ship recognition, to the extent that such inversions depend upon the sign of $W'_{yy}$. As an additional feature, the ISAR projection along the $W'_T$ direction can be converted to an equivalent "stretched" projection along the $W'_{yy}$ direction, which would have the further advantage of providing the maximum profile of the ship target as an aid to ship classification. Referring to FIG. 6, the "stretched" profile length, $h'_i$, associated with each scatterer, whose measured cross-range location is $h_i$, is found from, $$h'_i = \frac{h_i}{\cos \psi}, \tag{32}$$

where, $$\psi = \tan^{-1} \left( \frac{\widetilde{W}'_{zz}}{\widetilde{W}'_{yy}} \right) = \tan^{-1}(-\bar{b}) \tag{33}$$

from equations (12) and (15), so that, $$\cos \psi = \frac{1}{\sqrt{1 + \bar{b}^2}} \tag{34}$$

or, $$h'_i = h_i \sqrt{1 + \bar{b}^2} \tag{35}$$

The so-called "stretched" ISAR plot is displayed in the fourth quadrant of the split screen display depicted in FIG. 4, and is virtually the same projection as the range/elevation image projection depicted directly above it. The "stretched" projection provides useful quasi-profile imagery for values of $\psi$, (dependent upon relative net rotational vectors $W'_{yy}$ and $W'_{zz}$) between zero and about 60 degrees. For $\psi$ between 60 and 90 degrees, the "stretched" ISAR image would suffer distortion, so that the scaled (unstretched) projection, more nearly representative of a plan (range/azimuth) projection, is most advantageously plotted.

The advantages of the "scaled" or "stretched" ISAR images lie in the fact that their ordinate values are direct doppler representations rather than values derived from elevation angle measurements, so that the apparent noisiness of the ordinate locations would be substantially less than the image obtained from interferometrically determined angle measurements. Another way of stating this advantage, is that the usefulness of the "stretched" or "scaled" ISAR can be extended to appreciably greater range than the images derived from angle measurements.

The two approaches are used in complementary fashion: the three interferometrically derived range/azimuth, elevation/azimuth, and range/elevation plots provide 3 orthogonal ship image projections with no ship aspect angle sensitivity. The "stretched" or "scaled" ISAR projections have aspect sensitivity, with a preference for bow to stern aspect, but provide useful imagery for ship classification to greater range due to inherent less noisiness in displayed imagery at the longer ranges.

Ship translational motion must be tracked so that antenna boresight and range swath start bear a constant relationship with respect to the ship. Interferometric azimuth angle data from each useful ship resolution cell are averaged on an array-to-array basis. The solution for aircraft to ship relative range rate is tracked so as to advance or retard the range swath start trigger in accordance with ship as well as aircraft motion, so that corresponding ship range increments correspond from pulse-to-pulse. Correspondingly, range rate and azimuth rate corrections are applied by the system computer so as to also steer antenna boresight in both azimuth and elevation in accordance with both ship and aircraft translational motions.

The generation of a high resolution range/azimuth ship image permits the placement of a cursor at the location within the image of a particular resolution cell constituting the designated target cell. To carry out command weapon guidance to its ultimate accuracy capability, requires that the cursor location be tracked through a succession of images so as to be continuously superimposed over the initially designated resolution cell since the weapon is targeted to the cursor location. As time progresses, cursor tracking of a designated target cell is accomplished in terms of its predicted range/azimuth location referenced to the SAR bearing aircraft on the basis of the derived relative translation between aircraft and ship from aperture to aperture, indicated by the regression solution for line-of-sight sight velocity, denoted by $\bar{\epsilon}_{v'xx}$. As a result of a ship rotational component, $W_{zz}$, however, brought about principally by ship yaw motion, a target cell near the ship extremity, initially under the cursor, would appear to be rotating with respect to the cursor as time progressed, thereby producing a potentially significant cursor offset and consequent weapon delivery error. An additional tracking correction can be applied to the cursor location to eliminate this potential error source by recognizing that the ship rotational component, $W_{zz}$, can be learned from the regression solution for $V'_{yy}$, discussed previously. As demonstrated in the aforementioned application of Boles, entitled "Range/Azimuth Angle Ship Imaging For Ordnance Control", the range and azimuth distance corrections dy and dx, respectively, to be applied to the cursor coordinate locations are, $$dy = -x \int W_{zz} dt$$

and $$dx = y \int W_{zz} dt$$

where x and y are the initial cursor azimuth and range locations, and dt represents the time increment from initial cursor placement.

The derivations of the expressions for the velocity constants, as given by equations (20), (21), and (22) are based on the assumption that frequency (quantization) and azimuth angle (measurement) errors in equation (12) are negligible and that all measurement error resides in elevation only. To the extent that these assumptions are reasonably true, then the expressions for the velocity constants for nominal conditions of target range and nonrestrictive target size and aspect angle, are found to be virtually unbiased with random estimation errors as a function of normal system noise producing elements. Under conditions of extended range to the target, which introduces not only additional measurement noise but reduced solid angle subtended by the ship target, a condition generally unfavorable to regression estimating particularly when coupled with unfavorable ship aspect angle, considerable bias errors in velocity constant estimates result, which are due to the assumption that error resides in elevation only and neglects azimuth errors. (Frequency quantization errors are, in every case, negligible in typical SAR digital signal processing operations.) It is to be noted that such bias errors are recoverable by the formulation of regression equations whose nature is similar to those submitted herein. The utilization of the techniques of this invention, therefore, are considered to be without loss of generality by such possible extended conditions of operation.

Figure 7:
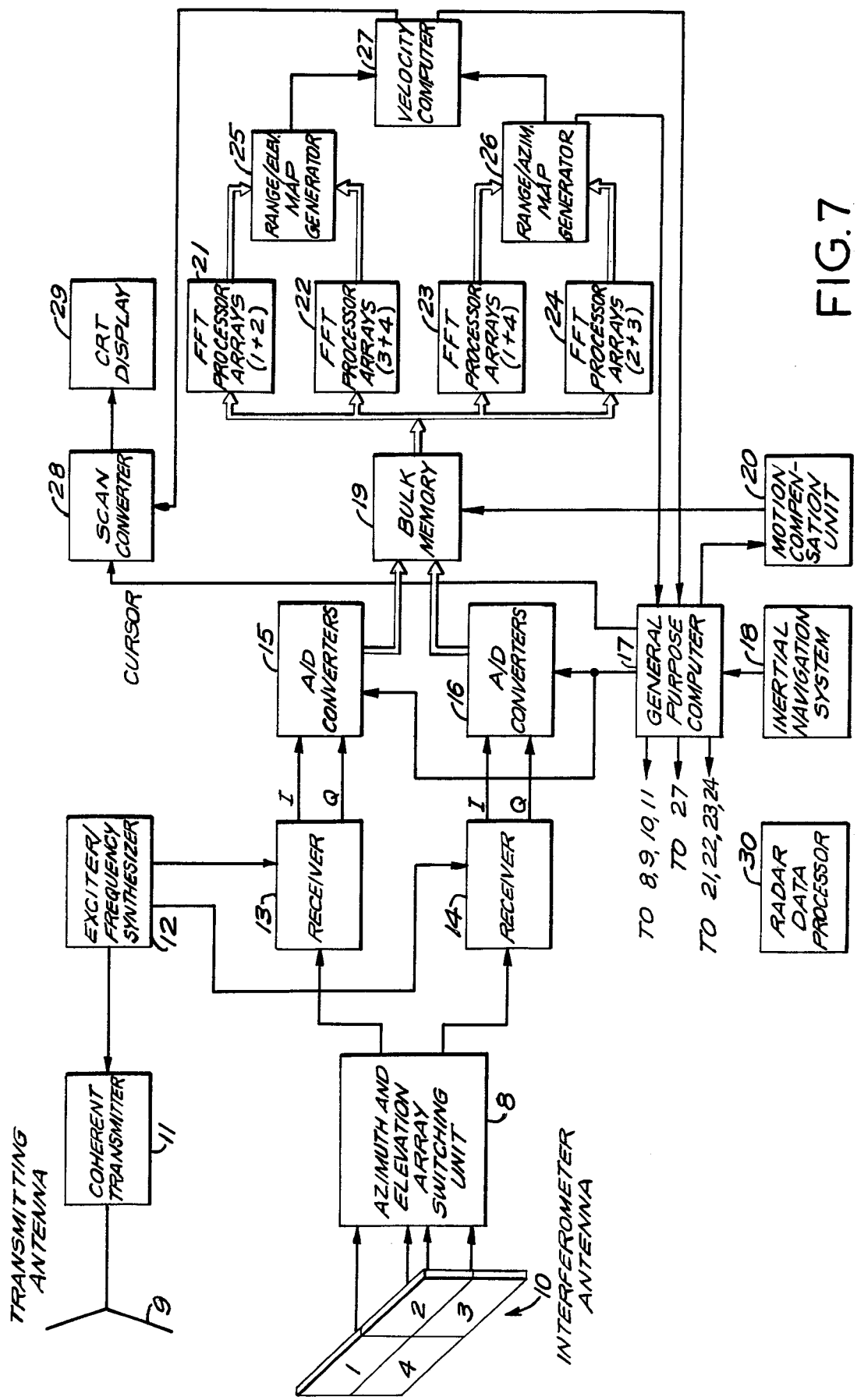
FIG. 7 is a block diagram illustrating the physical embodiments of the present invention.

Referring now to FIG. 7, a block diagram of the preferred embodiment of the system utilized for practicing the present invention is illustrated. As shown therein, pulses of electromagnetic energy generated in Coherent Transmitter 11 from reference signals derived in Exciter/Frequency Synthesizer 12 are radiated from Transmitting Antenna 9 so as to optimally illuminate a ship target under way on the surface of the sea. Signals reflected from the ship target are received by Interferometer Antenna 10 comprised of four separate receiving elements whose common boresight direction corresponds to that of Transmitting Antenna 9. Switching signals at the system pulse repetition frequency generated in General Purpose Computer 17 are applied to Azimuth And Elevation Array Switching Unit 8 for the purpose of combining signals received by the four antenna apertures so as to form interleaved azimuth and elevation signal pairs through two receiver channels (Receivers 13 and 14) for subsequent interferometric angle processing.

Accordingly, on odd pulse repetition intervals (pri's), the signals from antenna arrays 1 and 2 are coherently added in a microwave hybrid summing network located in Azimuth and Elevation Array Switching Unit 8, as are the signals from antenna Arrays 3 and 4, after which the two sums are separately inputted to Receivers 13 and 14, respectively, representing inputs to two separate synthetic arrays for elevation interferometric phase comparison. Similarly, on even pri's, signals from antenna arrays 1 and 4, as well as arrays 2 and 3 are separately added and inputted to Receivers 13 and 14, representing inputs to two separate synthetic arrays for azimuth interferometric phase comparison.

Reference signals from Exciter/Frequency Synthesizer 12, coherent with the transmitted signal, are applied to Receivers 13 and 14 to demodulate the alternating azimuth and elevation interferometer sums to quadrature related L and Q doppler shifted components, which represent the real and imaginary components of the instantaneous analog signal vectors out of the receivers. These analog signal components are digitized in the A/D Converters 15 and 16 at a sampling rate determined by system range resolution requirements. These digitized samples are alternately sorted on a pulse-to-pulse basis and are stored in Bulk Memory 19 for the subsequent processing of 4 range/doppler matrices, two of which are requisite for elevation angle determination on a cell by cell basis, and two for azimuth. Concurrently, motion compensation corrections for antenna phase center translational motions, as well as for ship translational motion, are computed and stored in Motion Compensation Unit 20 in a time sequenced order on the basis of computations performed in General Purpose Computer 17 of the two-way line-of-sight displacement change between antenna phase centers and the tracking center-of-gravity of the ship, predicated on the regression solution obtained for the line-of-sight velocity error, $\bar{\epsilon}_{v'xx}$, performed in Velocity Computer 27.

At the end of the coherent integration interval for which data is being collected, corrections stored in Motion Compensation Unit 20 are applied to the time sequences stored in Bulk Memory 19 in the form of vector rotations reflecting the two-way motion compensation phase correction to each range sample of each pulse of the (4) sequences stored in Bulk Memory 19. After motion compensation correction, data is read out of Bulk Memory 19 (as new data is being entered) for Fourier Transform digital signal processing to produce the necessary filtering so as to provide the desired resolution along the doppler sensitive direction and in each range bin in accordance with Equations 25 and 26, wherein the solutions for $\bar{V}'_{yy}$ and $\bar{V}'_{zz}$ are obtained from General Purpose Computer 17. The filtering is performed in FFT Processors 21 through 24 which perform Fast Fourier Transform digital processing so as to produce doppler resolved coherently integrated vector sums in each filter of each range bin.

The processed outputs of FFT Processors 21 through 24 are seen to represent range/doppler resolved vectors representing, respectively, the net signal power in the upper (Arrays 1 and 2), lower (Arrays 3 and 4), left (Arrays 1 and 4) and right (Arrays 2 and 3) antenna sections throughout their respective sampled intervals. The range/doppler resolved vectors from FFT Processors 21 and 22 are inputted to Range/Elevation Map Generator 25 where a phase comparison is made between corresponding range/doppler cell outputs on a cell-by-cell basis, for each resolution cell, to yield the interferometric elevation angle of the signal received in each such resolution cell, in accordance with well known interferometric principles, and as denoted by Equation (14), i.e., $\Delta\eta = \sin^{-1}[(\lambda/2\pi d_e)\phi_e]$, where $\Delta\eta$ is the elevation angle with respect to antenna boresight, $d_e$ is the elevation interferometer baseline, and $\phi_e$ is the measured electrical phase. Concurrently, and in an identical manner, the outputs of FFT Processors 23 and 24 are read into Range/Azimuth Map Generator 26 which produces the interferometric spatial azimuth angle $\overline{\Delta\theta}$, associated with each resolved range/doppler cell, in accordance with $\overline{\Delta\theta} = \sin^{-1}[(\lambda/2\pi d_a)\phi_a]$, where $d_a$ and $\phi_a$ are azimuth interferometer baseline length, and measured electrical phase of each resolution cell, respectively.

The range/doppler/elevation angle coordinates from Range/Elevation Map Generator 25 and the range/doppler/azimuth angle coordinates from Range/Azimuth Map Generator 26 (for each range/doppler resolved cell) are read into Velocity Computer 27 where a weighted multivariate regression solution, using doppler, elevation, and azimuth angle variables, is performed for the regression constants, $\bar{a}$, $\bar{b}$, and $\bar{c}$, in accordance with Equations (16) through (19), from which the velocity constants, $\bar{\epsilon}_{v'xx}$, $\bar{V}'_{yy}$, and $\bar{V}'_{zz}$, as specified by Equations (20) through (22), are computed in General Purpose Computer 17. The weight, $w_i$, applied to each coordinate, $x_i$, $y_i$, and $z_i$ entering the regression solutions, are read into Velocity Computer 27 from either of the FFT Processors 21-24 through either Range/Elevation Map Generator 25 or Range/Azimuth Map Generator 26. The values of $\lambda$, $f_r$, and $N_p$ used in the evaluation of Equations (20) through (22) are operating constants available in General Purpose Computer 17, where $f_r$ represents the pulse repetition frequency governing the formation of the interleaved azimuth and elevation synthetic apertures, each of which occurs at one half the pulse repetition frequency at which pulses are transmitted.

The regression solution for $\bar{\epsilon}_{v'xx}$ in General Purpose Computer 17 serves as a correction of $-\bar{\epsilon}_{v'xx}$ to the line-of-sight velocity estimate. Updated line-of-sight velocity is applied to Motion Compensation Unit 20 which applies motion compensation phase corrections to data stored in Bulk Memory 19 for the purpose of image focussing and to drive the residual doppler in the boresight direction, assumed centered at the center of rotation of the ship, to zero, so as to avoid possible doppler foldovers which could have a disturbing influence on the doppler/azimuth/elevation coordinate data provided to the Velocity Computer 27 for regression analysis. The remaining two velocity estimates, $\bar{V}'_{yy}$ and $\bar{V}'_{zz}$, are used in General Purpose Computer 17 to compute doppler bandwidth, BW, and integration time, T, for the formation of the next aperture, in accordance with Equations (27) and (28), so as to achieve a prescribed resolution of $d_{res}$ along the doppler sensitive direction, where the slant range, R, in Equation (27) is known in General Purpose Computer 17 on the basis of inputs from Inertial Navigation System 18. (The values of $N_p$ and $f_r$ for use in Equations (20) through (22) are obtained from the relation, $N_p = T f_r$, where $N_p$ is the number of pulses in the azimuth and elevation arrays, and $f_r$ is their rate of collection. The system pulse repetition frequency is twice $f_r$ due to the manner in which the elevation and azimuth arrays are interleaved.)

Azimuth and elevation angle data is scaled directly in feet along their respective directions in Velocity Computer 27 by multiplying by slant range, R, obtained from General Purpose Computer 17. Three sets of coordinate data depicting the locations of ship scatterers are transferred from Velocity Computer 27 to Scan Converter 28 for display on a split screen divided into four quadrants in CRT Display 29. These are the range/azimuth, azimuth/elevation, and range/elevation coordinate values, representing three orthogonal image projections of the ship target. A representation of such image projections for a hypothetical ship target is shown in FIG. 4.

"Scaled" or "stretched" representations of ISAR imagery are processed for display, in accordance with Equations (30) and (31) or Equation (35), whichever is applicable, on the basis of range/doppler data available in Velocity Computer 27, the solution for $\vec{W}'_T$, and wavelength, $\lambda$, from General Purpose Computer 17, and the solution for the regression estimate, $\bar{b}$, in Velocity Computer 27. The "scaled" or "stretched" ISAR data, dependent upon the solution for the angle $\psi$, obtained in General Purpose Computer 17, is read out from Velocity Computer 27 to Scan Converter 28, for subsequent display in the fourth quadrant of the split screen of CRT Display 29, as depicted in FIG. 4.

At longer ranges, interferometric angle measurements start to become noisy because of angle glint errors accompanying such measurements arising from normal receiver thermal noise limitations for fixed transmitter and antenna parameters. Due to aperture restrictions governing elevation angle measurement accuracy in the system cited herein, elevation locational errors in displayed imagery at long range due to such expected measurement noise are substantially reduced. However, the system range capability for displaying useful imagery can be materially extended by solving for smoothed elevation locational values on the basis of the equation governing the interrelationships of spacial angles, doppler frequency, and regression constants, stated by equation (29), as $\Delta \eta = \bar{a} \, (i_f) + \bar{b} \, (\Delta \theta) + \bar{c}$. By substituting the values of regression $\bar{a}$, $\bar{b}$, and $\bar{c}$, and the relatively accurate values of doppler cell index, $i_f$, and azimuth angle, $\Delta \bar{\theta}$, of each coordinate point into Equation 29, a smoothed value, $\Delta \eta$, is obtained for each such coordinate point. The smoothed elevation values, $\Delta \eta$, derived in this manner in Velocity Computer 27, are read into Scan Converter 28, to produce displayed images in the azimuth/elevation and range/elevation image projections of considerably greater accuracy than those that would have been produced by displaying the original elevation measurements themselves.

Antenna azimuth steering commands are generated in General Purpose Computer 17 on the basis of aircraft navigational data inputs from the Inertial Navigation System 18 and averaged interferometric azimuth angle measurements from the various ship scatterers provided by Range/Azimuth Map Generator 26, in such a manner as to maintain the average of all interferometric azimuth angles at zero (with respect to its electrical boresight) when smoothed with a tracking filter in General Purpose Computer 17 over successive apertures. The net pulse-to-pulse two-way line-of-sight displacement change due to relative translational motion between aircraft and ship computed in General Purpose Computer 17 for purposes of motion compensation, also serves as a basis for controlling the precise timing for the start of range sampling at A/D Converters 15 and 16, so that corresponding samples from pulse-to-pulse over the coherent integration interval represent the same range increment of the ship. The net line-of-sight displacement change with time, in conjunction with aircraft altitude available in General Purpose Computer 17 from other on-board sensors, is used to provide elevation steering to the transmitting and receiving Interferometer Antennas 9 and 10.

Cursor placement to a desired range/azimuth resolution cell of the ship image is achieved by operator designation of video signals through General Purpose Computer 17 and applied to Scan Converter 28. Cursor tracking of the designated ship target resolution cell during the weapon delivery phase is similarly controlled by General Purpose 17 on the basis of its computations of target cell range and azimuth angle change with time derived from its navigational solutions for translational motions between aircraft and ship, wherein said cursor video signals are injected into appropriate range/azimuth resolution cells as time progresses. Second order corrections to cursor tracking of the designated ship target cell to eliminate potential tracking errors arising from ship rotational (yaw) motion are effected as previously described in the aforementioned application of Boles, entitled "Range/Azimuth Angle Ship Imaging For Ordnance Control". The range/azimuth/elevation coordinates of the targeted part of the ship for standoff command guidance weapon delivery is indicated by the cursor location which is tracked in General Purpose Computer 17.

Control signals for the pointing of Antennae 9 and 10 and for pulse repetition frequency (prf) control of coherent Transmitter 11 are obtained from General Purpose Computer 17. All task management such as data transmission and initiation of subroutine sequences, are performed by the Radar Data Processor 30.

The useful range of the system can be extended by smoothing the derived velocities $\bar{\varepsilon}_{v'xx}$, $\bar{V}'_{yy}$ and $\bar{V}'_{zz}$ using state-of-the-art curve fitting techniques to such data derived over multiple apertures, implemented in the General Purpose Computer 17.

The interleaving of pulses contributing to the formation of separate arrays for azimuth and elevation angle determination using two receivers is but one of several possible implementations for producing azimuth and elevation data, and should not be considered as a limitation to the invention.

Although separate transmitting and receiving antennae have been illustrated in the block diagram of FIG. 7, both transmitting and receiving functions could be combined into a single aperture. All elements in the block diagram can be either manufactured or purchased as separate commercial entities and incorporated into the embodiments of this invention by those skilled in the art. Also, many of the functional units shown separately in FIG. 7 can be combined for purposes of design economy.

Thus, although the invention has been described and illustrated in detail, it is to be understood that the same is exemplary and is not to be taken by way of limitation, the spirit and scope of this invention being limited only by the terms of the appended claims.

What is claimed is:

1. In conjunction with an airborne synthetic aperture radar system having an interferometer antenna and a display, a method for forming high resolution synthetic aperture radar imagery of a ship target under the influence of sea state conditions comprising the steps of:

(a) processing the received signals from the scatterers comprising the ship target to obtain estimates of (1) the net doppler producing cross line-of-sight velocity of the radar bearing aircraft relative to the ship, and (2) the net doppler producing velocity in the direction orthogonal to the cross line-of-sight relative velocity and the radar line-of-sight to the center of rotation tracking point of the ship;

(b) determining from the estimated doppler producing velocities the values of predetermined system parameters to be used predictively in the succeeding integration interval in forming the high resolution image of the ship target; and (c) displaying the formed imagery of the ship target including a range/azimuth projection, an azimuth/elevation profile projection, and a range/elevation profile projection.

2. In conjunction with an airborne synthetic aperture radar system having an interferometer antenna and a display, a method for forming high resolution synthetic aperture radar imagery of a ship target under the influence of sea state conditions comprising the steps of:

(a) processing the received signals from the scatterers comprising the ship target to obtain estimates of (1) the net doppler producing cross line-of-sight velocity of the radar bearing aircraft relative to the ship, and (2) the net doppler producing velocity in the direction orthogonal to the cross line-of-sight relative velocity and the radar line-of-sight to the center of rotation tracking point of the ship;

(b) determining from the estimated doppler producing velocities the values of predetermined system parameters to be used predictively in the succeeding integration interval in forming the high resolution imagery of the ship;

(c) displaying the formed imagery of the ship target including a range/azimuth projection, an azimuth/elevation profile projection, and a range/elevation profile projection; and (d) forming and displaying an inverse synthetic aperture radar profile image projection of the ship target.

3. In conjunction with an airborne synthetic aperture radar system having an interferometer antenna and a display, a method for forming and displaying high resolution synthetic aperture radar imagery of a ship target under the influence of sea state conditions comprising the steps of:

(a) compensating using an estimate of the net doppler producing line-of-sight velocity of the radar bearing aircraft relative to the ship for phase variations in the received signals from the scatterers comprising the ship target resulting from the respective motions of the radar bearing aircraft and the ship;

(b) processing in conjunction with azimuth and elevation angle interferometric techniques the compensated received signals to obtain estimates of (1) the error in the estimated net doppler producing line-of-sight velocity of the radar bearing aircraft relative to the ship, (2) the net doppler producing cross line-of-sight velocity of the radar bearing aircraft relative to the ship, and (3) the net doppler producing velocity in the direction orthogonal to the cross line-of-sight to the center of rotation tracking point of the ship;

(c) determining from the estimated cross line-of-sight relative velocity and the estimated orthogonal velocity the values of predetermined system parameters to be used predictively in the succeeding integration interval in forming the high resolution imagery of the ship target; and (d) displaying the formed imagery of the ship target.

4. A method as recited in claim 3 wherein the step of processing the compensated received signals includes:

(a) measuring interferometrically the azimuth and elevation angles of the received signal in each doppler filter in each range bin; and (b) obtaining from predefined characteristics derived from a weighted multivariate regression fit to the doppler processed azimuth and elevation angle measurement data the estimates of (1) the error in the estimated net doppler producing line-of-sight velocity of the radar bearing aircraft relative to the ship, (2) the net doppler producing cross line-of-sight velocity of the radar bearing aircraft relative to the ship, and (3) the net doppler producing velocity in the direction orthogonal to the cross line-of-sight relative velocity and the radar line-of-sight to the center of rotation tracking point of the ship.

5. A method as recited in claim 4 wherein the displayed imagery of the ship target includes a range/azimuth projection, an azimuth/elevation profile projection, and a range/elevation profile projection.

6. A method as recited in claim 5 including the further steps of forming and displaying an inverse synthetic aperture radar profile image projection of the ship target.

7. A method as recited in claim 6 including the further step of scaling the cross-range dimension of the displayed inverse synthetic aperture radar profile image projection of the ship target.

8. A method as recited in claim 7 including the further step of converting the displayed scaled inverse synthetic aperture radar profile image projection of the ship target to a stretched inverse synthetic aperture radar profile image projection.

9. In conjunction with an airborne synthetic aperture radar system having an interferometer antenna and a display, a method for forming and displaying high resolution synthetic aperture radar imagery of a ship target under the influence of sea state conditions comprising the steps of:

(a) steering the pointing of the interferometer antenna boresight to provide radar illumination of the ship target;

(b) controlling the range sampling timing so that corresponding samples from pulse-to-pulse over the integration interval correspond to the same range increment of the ship target;

(c) compensating using an estimate of the net doppler producing line-of-sight velocity of the radar bearing aircraft relative to the ship for phase variations in the received signals from the scatterers comprising the ship target resulting from the respective motions of the radar bearing aircraft and the ship;

(d) measuring interferometrically the azimuth and elevation angles of the compensated received signal in each doppler filter in each range bin;

(e) obtaining from selected regression constants derived from a weighted least squares multivariate regression fit to the doppler processed azimuth and elevation angle measurement data estimates of (1) the error in the estimated net doppler producing line-of-sight velocity of the radar bearing aircraft relative to the ship, (2) the net doppler producing cross line-of-sight velocity of the radar bearing aircraft relative to the ship, and (3) the net doppler producing velocity in the direction orthogonal to the cross line-of-sight relative velocity and the radar line-of-sight to the center of rotation tracking point of the ship;

(f) determining from the estimated cross line-of-sight relative velocity and the estimated orthogonal velocity the values of predetermined system parameters to be used predictively in the succeeding integration interval in forming the high resolution imagery of the ship target; and (g) displaying the formed imagery including a range/azimuth projection, an azimuth/elevation profile projection, and a range/elevation profile projection of the ship target.

10. A method as recited in claim 9 including the further steps of cursoring a designated resolution cell of the displayed imagery of the ship target; and tracking from aperture to aperture the range and interferometric azimuth angle of the designated resolution target cell.

11. A method as recited in claim 10 including the further step of applying to the cursor location on an aperture to aperture basis a tracking correction to compensate for the rotation of the ship about an axis orthogonal to both the horizontal ship rotational axis and the radar line-of-sight to the center of rotation tracking point of the ship.

12. A method as recited in claim 11 including the further steps of obtaining and utilizing smoothed elevation locational values in forming the displayed azimuth-/elevation profile and range/elevation profile image projections of the ship target.

13. A method as recited in claim 12 including the further steps of
(a) smoothing using the doppler processed azimuth and elevation angle measurement data obtained over multiple apertures the estimates obtained for (1) the error in the estimated net doppler producing line-of-sight velocity of the radar bearing aircraft relative to the ship, (2) the net doppler producing cross line-of-sight velocity of the radar bearing aircraft relative to the ship, and (3) the net doppler producing velocity in the direction orthogonal to the cross line-of-sight relative velocity and the radar line-of-sight to the center of rotation tracking point of the ship;
(b) determining from the smoothed estimated cross line-of-sight relative velocity and the smoothed estimated orthogonal velocity the values of the predetermined system parameters including synthetic aperture radar integration time and pulse repetition frequency and doppler filter bandwidths and spacings to be used predictively in the succeeding integration interval in forming the high resolution imagery of the ship target; and
(c) displaying the formed imagery of the ship target.

14. A method as recited in claim 13 including the further steps of forming and displaying an inverse synthetic aperture radar profile image projection of the ship target.

15. A method as recited in claim 14 including the further step of scaling the cross-range dimension of the displayed inverse synthetic aperture radar profile image projection of the ship target.

16. A method as recited in claim 15 including the further step of converting the displayed scaled inverse synthetic aperture radar profile image projection of the ship target to a stretched inverse synthetic aperture radar profile image projection.

17. A method as recited in claim 16 including the further steps of:
(a) smoothing using the doppler processed azimuth and elevation angle measurement data obtained over multiple apertures the estimate obtained for (1) the error in the estimated net doppler producing line-of-sight velocity of the radar bearing aircraft relative to the ship, (2) the net doppler producing cross line-of-sight velocity of the radar bearing aircraft relative to the ship, and (3) the net doppler producing velocity in the direction orthogonal to the cross line-of-sight relative velocity and the radar line-of-sight to the center of rotation tracking point of the ship;
(b) determining from the smoothed estimated cross line-of-sight relative velocity and the smoothed estimated orthogonal velocity the values of the predetermined system parameters including synthetic aperture radar integration time and pulse repetition frequency and doppler filter bandwidths and spacings to be used predictively in the succeeding integration interval in forming the high resolution imagery of the ship target; and
(c) displaying the formed imagery of the ship target.

18. In combination with an airborne synthetic aperture radar system including a multiple section interferometer antenna operatively connected to the input to a two way channel receiver and doppler processing system, and a display operatively connected to the output of said two channel receiver and doppler processing system, image signal processing means for forming and displaying high resolution synthetic aperture radar imagery of a ship target under the influence of sea state conditions comprising:
(a) means for obtaining from a weighted multivariate regression fit to the doppler processed interferometric azimuth and elevation angle measurement data the estimates of (1) the error in the estimated net doppler producing line-of-sight velocity of the radar bearing aircraft relative to the ship, (2) the net doppler producing cross line-of-sight velocity of the radar bearing aircraft relative to the ship, and (3) the net doppler producing velocity in the direction orthogonal to the cross line-of-sight relative velocity and the radar line-of-sight to the center of rotation tracking point of the ship, and smoothing using velocities derived from the regression solutions obtained over mulitple apertures smoothed estimates for (1) the error in the net doppler producing line-of-sight velocity of the radar bearing aircraft relative to the ship, (2) the net doppler producing cross line-of-sight velocity of the radar bearing aircraft relative to the ship, and (3) the net doppler producing velocity in the direction orthogonal to the cross line-of-sight relative velocity and the radar line-of-sight to the center of rotation tracking point of the ship, and for determining from the smoothed estimated cross line-of-sight relative velocity and the smoothed estimated orthogonal velocity the values of the predetermined system parameters including synthetic aperture radar integration time and pulse repetition frequency and doppler filter bandwidths and spacings to be used predictively in the succeeding integration interval in forming the high resolution imagery of the ship target;
(b) means for compensating using a smoothed estimate of the net doppler producing line-of-sight velocity of the radar bearing aircraft relative to the ship for phase variations in the received signals from the scatterers comprising the ship target resulting from the respective line-of-sight motions of the radar bearing aircraft and the ship;
(c) means for forming and displaying scaled range/azimuth, azimuth/elevation, and range/elevation projected images of the ship target, and obtaining and utilizing smoothed elevation locational values in forming the displayed azimuth/elevation and range/elevation image projections;

(d) means for forming and displaying an inverse synthetic aperture radar (ISAR) profile image projection of the ship target with scaled cross-range dimensions, and converting the scaled inversed synthetic aperture radar (ISAR) profile image projection of the ship target to a stretched ISAR profile image projection;

(e) means for cursoring a designated resolution cell of the displayed imagery of the ship target and for tracking from aperture to aperture the range and interferometrically determined azimuth of the designated resolution target cell, and applying to the cursor location on an aperture to aperture basis a tracking correction to compensate for the rotation of the ship about the axis orthogonal to both the horizontal ship rotational axis and the radar line-of-sight to the center of rotation tracking point of the ship;

(f) means for steering the pointing of the interferometer antenna boresight to provide optimum radar illumination of the ship target and image centering along the azimuth and elevation axis; and (g) means for controlling the range sampling timing so that corresponding samples from pulse to pulse over the integration interval correspond to the same range increment of the ship target.

* * * * *